Figure 1:
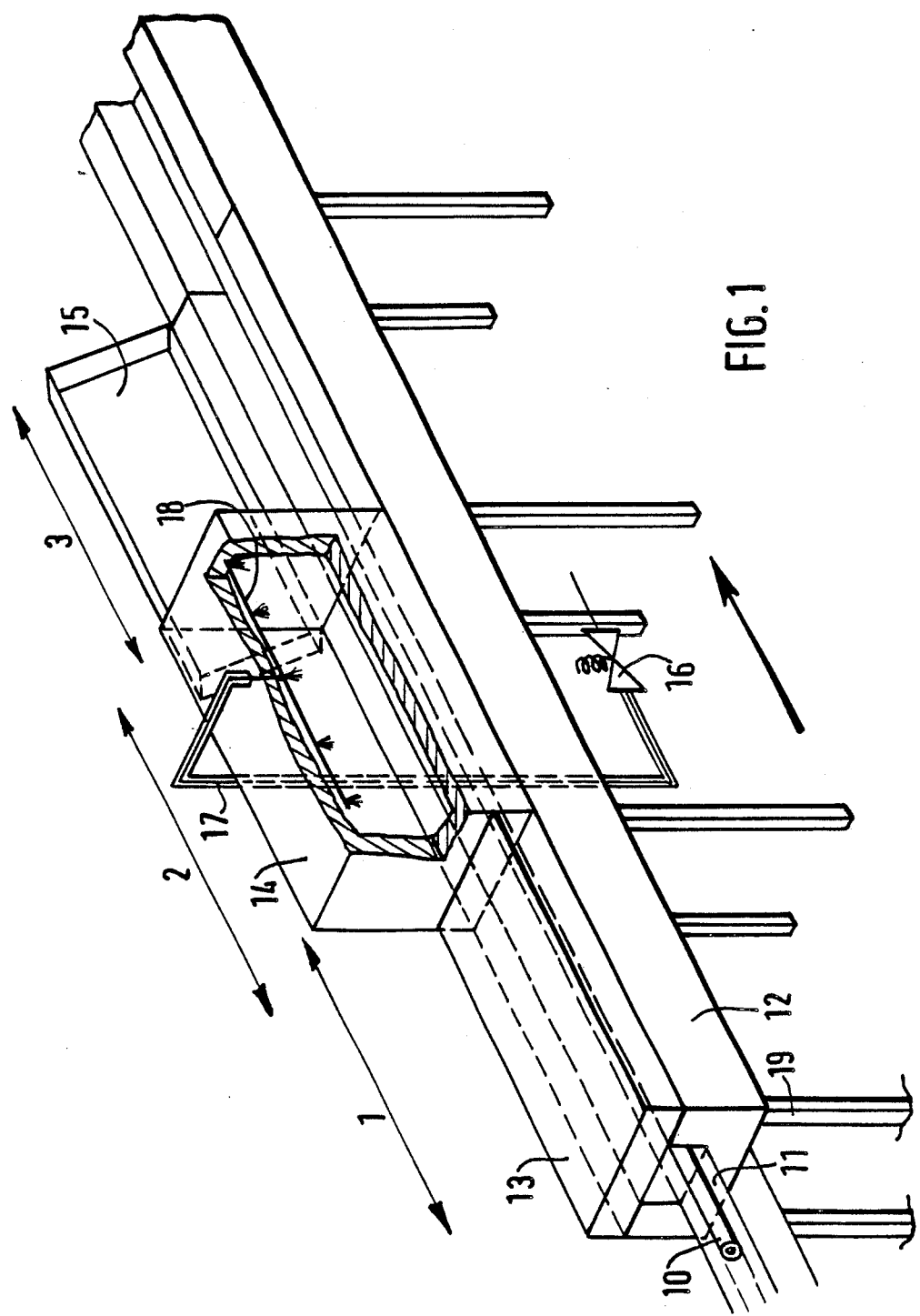

United States Patent [19]

Lermuzeaux et al.

[11] Patent Number: 4,931,232

[45] Date of Patent: Jun. 5, 1990

[54] COOLING PROCESS FOR A CONTINUOUSLY EXTRUDED PRODUCT

[75] Inventors: Andre Lermuzeaux, Sucy-en-Brie; Patrice Barthelmes, Montigny-le-Bretonneux, both of France

[73] Assignee: L'air Liquide, Societe Anonyme pour l'etude et l'exploitation des Procedes Georges Claude, Paris, France

[21] Appl. No.: 246,792

[22] Filed: Sep. 21, 1988

[30] Foreign Application Priority Data

Sep. 21, 1987 [FR] France .................. 87 13047

[51] Int. Cl.⁵ .................. B29C 35/16; B29C 47/78
[52] U.S. Cl. .................. 264/28; 62/63; 62/64; 264/211.18
[58] Field of Search .......... 264/28, 211.13, 211.18, 264/237, 348; 425/71, 404; 62/63, 64, 374, 380

[56] References Cited

U.S. PATENT DOCUMENTS

| 3,254,506 | 6/1966 | Braeking | 62/379 |
|---|---|---|---|
| 3,258,935 | 7/1966 | Ross | 62/374 |
| 3,345,828 | 10/1967 | Klee et al. | 62/63 |
| 3,403,527 | 10/1968 | Berreth et al. | 62/374 X |
| 3,494,140 | 2/1970 | Harper et al. | 62/190 |
| 3,583,171 | 6/1971 | Flynn et al. | 62/266 |
| 3,757,533 | 9/1973 | Kent | 62/303 |
| 4,212,171 | 7/1980 | Soecknick | 62/63 |
| 4,229,947 | 10/1980 | Klee | 62/374 |
| 4,757,691 | 7/1988 | Compagnon | 62/63 |

FOREIGN PATENT DOCUMENTS

| 1391 | 4/1979 | European Pat. Off. . |
| 65896 | 12/1982 | European Pat. Off. . |
| 84683 | 8/1983 | European Pat. Off. . |
| 135106 | 3/1985 | European Pat. Off. . |
| 2088148 | 1/1972 | France . |
| 2306413 | 10/1976 | France . |
| 1329637 | 9/1973 | United Kingdom . |

Primary Examiner—Jeffery Thurlow
Assistant Examiner—Leo B. Tentoni
Attorney, Agent, or Firm—Young & Thompson

[57] ABSTRACT

A process for continuous cooling of an extruded product, wherein the product passes successively in its direction of movement in a tunnel through at least three cooling zones; an upstream zone for cooling by convection in which the gas and the product move countercurrently, a cooling zone by cryogenic fluid spraying on the product, and a downstream stabilization zone in which the gas and the product move concurrently.

4 Claims, 2 Drawing Sheets

COOLING PROCESS FOR A CONTINUOUSLY EXTRUDED PRODUCT

The present invention relates to a continuous cooling process for extruded or elongated products, by a cryogenic fluid.

In numerous fields of industry, and in particular in the food field, it is necessary to cool products made by extrusion, extrusion cooking, forming, co-extrusion or co-extrusion-cooking, for example, as they immediately they leave the extruder or former.

The temperature at the outlet of these machines is, however, in general too high to perform directly on the extruded or formed product the final treatment of cutting, packaging, or coating, and simple air cooling is too slow.

It is thus necessary to cool the product with cryogenic fluid to render it manipulable, at a cooling speed at least equal to the speed of fabrication and under favorable heat exchange conditions, so as to obtain adequate cooling and minimum consumption of cryogenic fluid.

Thus, the present invention relates to a process for continuously cooling a product shaped or extruded in an elongated shape of the type in which the product is cooled while moving through a tunnel cooled by cryogenic fluid, characterized in that the product passes successively in its direction of movement through the tunnel through at least three cooling zones: an upstream zone of cooling by convection in which the gas and the product move countercurrently; a zone of cooling by spraying cryogenic fluid on the product; and a downstream stabilization zone in which the gas and the product move cocurrently.

Preferably, the cooling zones according to the invention are free from mechanical means for agitating the gas.

So as to ensure easy and rapid flow of the cold gas along the product cocurrently or countercurrently, the internal cross section of the tunnel should be adapted to the size of the formed or extruded product to be cooled. Thus, it is preferable according to the invention that the cross section of the tunnel be about five to thirty times, particularly 11 to 15 times the cross section of the product.

As sprayed cryogenic fluid according to the invention, can be used nitrogen or carbon dioxide. According to its nature, the fluid is in solid or liquid phase after spraying and before its sublimation.

Preferably, in the cooling zone by spraying, the latter takes place from a distance such that the cryogenic fluid enters into contact with the product in liquid or solid phase, but preferably without accumulation of liquid or solid on the product.

As will be seen from the example, the invention is particularly applicable to coextruded products in the food industry, in which it is necessary to act quickly to cool the external material and the filling, failing which the final treatments, such as cutting, are difficult; moreover, a partial external cooling does not suffice, because given the thermal coefficients, the filling tends to remain hot and reheat the whole. However, the invention is applicable to other fields of industry, for example the field of pressure-molded products.

The length of the conversion and/or stabilization zones, and the flow of cryogenic fluid, are chosen as a function of the temperature of the extruded or coextruded product, its speed of extrusion, the thermal coefficients of the product or products extruded or coextruded and of the maximum temperature of final handling.

The process according to the invention may be practiced and downstream of an extruder or former producing several parallel products or downstream of several extruders or formers. The products are treated in the same way. There could thus be provided a continuous wide strip or several continuous parallel strips, whose total width is substantially of the same width as the width of the inside of the chamber.

The cooling is effected by gas resulting from the expansion of fluid, by convection. The small cross section of the gas passage permits speeding the gases which reach a sufficient value for a sufficient convection. It therefore seems particularly important that sealing be provided, between the cover and base of the chamber and between the sections, to avoid the loss of gas and hence the speed of flow.

Figure 2:
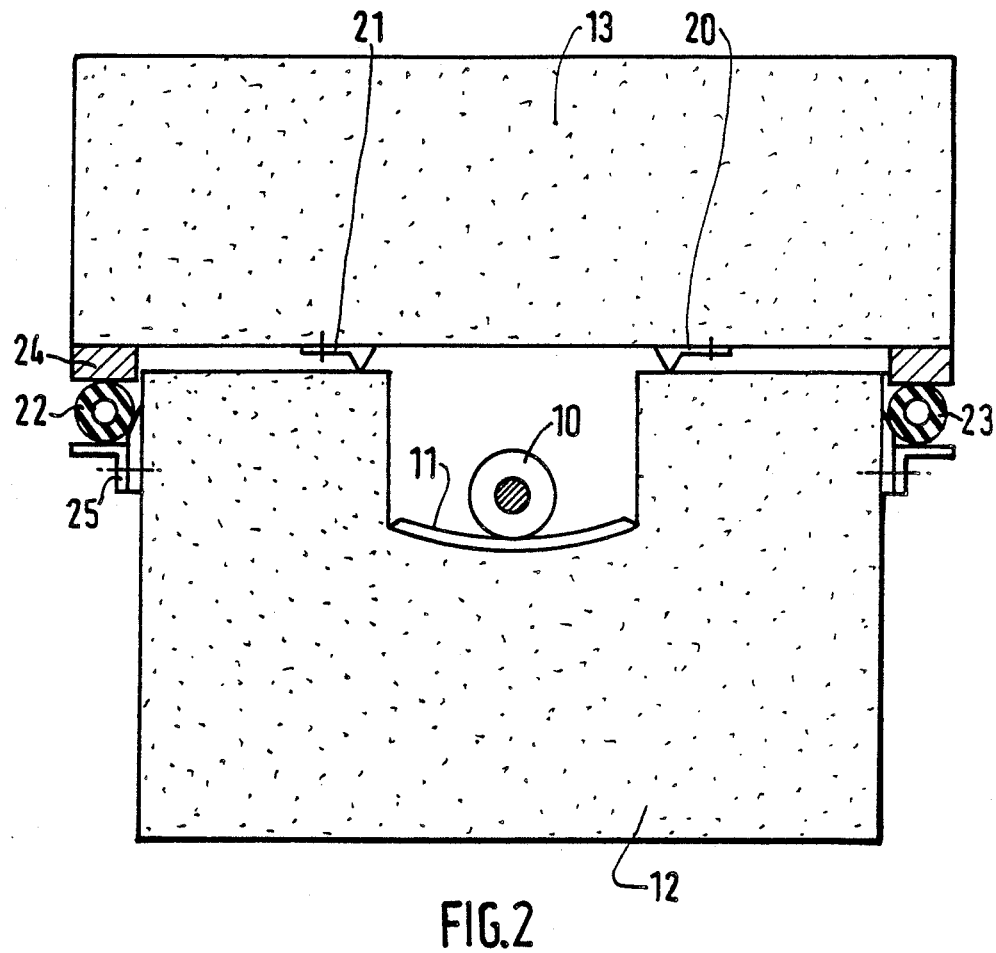

An exemplary embodiment will now be described with respect to the accompanying drawings in which:

FIG. 1 shows a partial exploded schematic assembly view of an installation for use in practicing a process according to the invention; and FIG. 2 shows a transverse cross section of a section of the installation.

The tunnel shown in FIG. 1 is adapted for the continuous cooling of a coextruded product coming continuously from a non-illustrated extruder upstream of the tunnel in the direction of extrusion (indicated by an arrow). This horizontal tunnel, of generally elongated shape and rectangular cross section comprises three zones or sections 1, 2, 3.

The product 10 rests on an endless belt 11 disposed in the bottom of the tunnel substantially of the same width as the width of the interior of the tunnel. This belt is driven continuously lengthwise by non-illustrated means, of the drive drum type actuated by a motor.

The belt 11 may be of glass fiber material covered with silicone. But any other material which is flexible and does not adhere to the product at low temperature can be used.

The tunnel is constituted by a base 12 of U-shaped cross section, forming a trough, through which travels the belt 11, the various portions 1, 2, 3 being defined by the cover (13, 14, 15) closing the casing with a sealed joint.

The walls of base 12 and the covers 13, 14, 15 are of thermally insulating material, used in the usual manner for cooling material.

In the zones, such as zones 1 and 3 in which no fluid is dispensed, the covers are simple flat walls; and the zone 2 for cooling by spraying comprises the cover 14 in the shape of a chamber. In another non-illustrated embodiment, the zone 2 comprises a flat cover provided with dispensing means.

A source of cryogenic fluid, not shown, feeds, through an electrovalve 16, a conduit 17 conducting the cryogenic fluid to the manifold 18 for distribution by nozzles to the interior of chamber 14. The manifold 18 can also be simply perforated for the distribution of the fluid.

The covers are articulated lengthwise of the chamber by means of non-illustrated hinges; the cover 13 is shown in closed position, 15 in open position. In another modification, they can be simply set on base 12.

The tunnel assembly is supported on legs 39 whose height is adapted or adaptable to the height of the outlet of the extruder.

As sealing means for the tunnel along its length, V-shaped joints can be provided on opposite sides of the free passage of the tunnel, the tubular plastic or elastic joints being compressed between two abutments outside the chamber. Preferably, a double joint system is used to ensure complete sealing of the cold gas.

Thus, in FIG. 2 will be seen the U-shaped chamber 12, and a cover 13 resting on a double system of joints. On the one hand, V-shaped joints 20, 21, preferably metallic, which remain flexible when cold, are disposed between the cover and the upper walls of the U-shaped chambers.

On the other hand, hollow cylindrical joints of plastic material 22, 23 ensure sealing by compression between an abutment 24 fixed on the cover and a support 25 fixed to the chamber.

Other known sealing means can be provided.

EXAMPLE

In a device according to the invention, coextruded filled pastry is cooled at 0.32 m/s at 130° C. on the exterior and 110° C. on the interior.

The quenching temperatures should be 60° C. at the exterior and 40° C.–50° C. at the interior.

The diameter of the pastry is 13 to 14mm, and that of the filling 10mm.

The cooling is effected with an apparatus such as that shown in FIG. 1, the length of the zone 1 being 1m, of zone 2 2m and zone 3 5m, the cross section of the passage being $4 \times 5$ cm$^2$.

The material consumes 85 to 100 l/h of $LN_2$.

The process may be practiced on pastries extruded or shaped under pressure.

What is claimed is:

1. A process for the continuous cooling of an extruded product of elongated shape, comprising moving the product lengthwise through a cooling tunnel from an upstream end of the tunnel to a downstream end thereof while spraying onto the product a cryogenic substance in a phase denser than gaseous phase that vaporizes to a gas, and establishing in said tunnel at least three cooling zones comprising an upstream zone in which said product and a portion of said gas move countercurrently in contact with each other, a central zone in which said spraying is effected, and a downstream stabilization zone in which said product and another portion of said gas move cocurrently in contact with each other.

2. A process as claimed in claim 1, in which said cryogenic substance is directed vertically downwardly onto the product.

3. A process as claimed in claim 1, in which said countercurrently moving portion of gas continues in the same direction out said upstream end of the tunnel and said cocurrently moving another portion of gas continues in the same direction out said downstream end of the tunnel.

4. A process as claimed in claim 1, in which said cryogenic substance is selected from the group consisting of nitrogen and carbon dioxide.

* * * * *